(12) United States Patent
van Heeswyk et al.

(10) Patent No.: US 6,333,947 B1
(45) Date of Patent: Dec. 25, 2001

(54) INTERFERENCE CANCELLATION SYSTEM AND METHOD AND CDMA RECEIVER INCLUDING AN INTERFERENCE CANCELLATION CIRCUIT

(75) Inventors: Frank Martin van Heeswyk, Nepean; Paul Newson, Kanata, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/199,301

(22) Filed: Nov. 25, 1998

(51) Int. Cl.[7] .............................. H04B 15/00; H04K 1/00; H04L 27/30
(52) U.S. Cl. ............................................ 375/148; 375/346
(58) Field of Search ..................................... 375/346, 148, 375/347, 144, 284, 285, 278; 455/501, 570, 295, 296

(56) References Cited

U.S. PATENT DOCUMENTS

| 4,641,238 | 2/1987 | Kneib ..................................... 364/200 |
| 5,075,697 | * 12/1991 | Koizumi et al. ...................... 342/361 |
| 5,272,727 | * 12/1993 | Okanoue .............................. 375/341 |
| 5,367,563 | 11/1994 | Sainton ................................. 379/98 |
| 5,577,105 | 11/1996 | Baum et al. .......................... 379/93 |
| 5,812,600 | * 9/1998 | Hess et al. ............................ 375/261 |
| 6,192,067 | * 2/2001 | Toda et al. ............................ 375/144 |

OTHER PUBLICATIONS

Qualcomm CDMA Cell Site Modem (CSM) Data Sheet.

* cited by examiner

*Primary Examiner*—Chi Pham
*Assistant Examiner*—Phuong Phu

(57) ABSTRACT

Systems and methods for cancelling interference in received CDMA signals due to known components in the received signals which have been digitized to form a composite digitized baseband signal, for example due to pilot channel components in received CDMA IS-95 3G compliant signals which would otherwise interfere with the detection of unknown data streams. The pilot channel signals are detected, and an estimate of the air interface for each pilot channel signal is made. The pilot channel signals are then passed through a respective model of the air interface, and the resulting output is subtracted from the composite digitized baseband signal, thereby removing interference due to the pilot channel signals.

15 Claims, 10 Drawing Sheets

INTERFERENCE CANCELLATION SYSTEM AND METHOD AND CDMA RECEIVER INCLUDING AN INTERFERENCE CANCELLATION CIRCUIT

FIELD OF THE INVENTION

The invention relates to an interference cancellation system and method and to a CDMA receiver including an interference cancellation circuit, and more particularly to a system and method for cancelling interference in CDMA receivers due to pilot channels or other known components of a received wideband signal.

BACKGROUND OF THE INVENTION

The link from a mobile station to a basestation in 3G (third generation) CDMA (code division multiple access) systems is a multiple access radio channel that uses CDMA as the access scheme. In this scheme many users share the same radio channel and each user is uniquely identified by a spreading code.

In 3G CDMA, the mobile transmitter in the mobile station is used by the end user to access the network. It may provide voice only, data only, simultaneous voice and data, and location services for many different environments including indoor, low mobility, full mobility, and fixed wireless. To support the various end user services, the mobile transmitter divides its transmission content into four channels. One of these channels, namely the pilot channel, is used to manage the air interface resource and aid in signal detection. The remaining three channels are used to carry user data and to implement the air interface protocol.

The pilot channel carries pilot bits which have the characteristic that they are known at the receiver, and also carries PC (power control) bits which though unknown at the receiver are easily detectable at the receiver, while the remaining subchannels carry information which is unknown at the receiver.

It is a well known fact that due to the nature of CDMA, the signals transmitted by one user will occupy the same bandwidth as signals transmitted by other users and in fact all the signals of other users may be modelled as a form of interference. About 30% of the interference caused by other users is attributable to the pilot channels and 70% is attributable to the remaining information channels. Many interference cancellation schemes have been proposed for eliminating the entire contribution of other users. Such schemes are very complex because some sort of estimate of the received signal for other users including unknown components must be made.

Any substantial reduction in interference in a CDMA system is very important because this results in an effective increase in the system signal to noise ratio, and thereby allows a system to be deployed with fewer basestations. One of the most significant costs in deploying a CDMA network is simply that of obtaining rights to install basestations at the desired locations. Any decrease in the number of basestations required, even at the expense of a slightly increased cost per basestation, would be desirable.

SUMMARY OF THE INVENTION

It is an object of the invention to obviate or mitigate one or more of the above identified disadvantages.

According to a first broad aspect, the invention provides an interference cancellation circuit for cancelling interference due to known information contained in a component of a digitized baseband composite signal, the circuit comprising: known information detection and air interface characterization circuitry for detecting said known information stream, demodulating said component and making an air interface characterization which is an estimate of an air interface channel over which the component was transmitted; digitized baseband component regeneration circuitry for generating an estimated component which is an estimate of said component of the digitized baseband composite signal by modulating said known information stream taking into account said air interface channel characterization; delay circuitry for delaying the digitized baseband composite signal an amount substantially equal to the time it takes the known information detection and air interface characterization circuitry and component regeneration circuitry to create the estimated component; and subtraction circuitry for subtracting the estimated component from the delayed digitized baseband composite signal to create a corrected digitized baseband composite signal.

According to a second broad aspect, the invention provides an interference cancellation circuit for cancelling interference due to particular components of a composite baseband digitized signal which contains both known and unknown information, the circuit comprising: known information detection and air interface characterization circuitry for detecting said known information, demodulating each said particular component and making an air interface characterization which is an estimate of an air interface channel over which the particular component was transmitted; estimation circuitry for making an estimate of the unknown information in each said particular component containing known information; combining circuitry for combining for each said particular component the known information with the estimated unknown information to make a respective combined information; digitized baseband component regeneration circuitry for generating an estimated component for each said combined information which is an estimate of the respective particular component of the digitized baseband composite signal by modulating said combined information taking into account said air interface characterization; delay circuitry for delaying the digitized baseband composite signal an amount substantially equal to the time it takes the known information detection and air interface characterization circuitry and component regeneration circuitry to create the estimated components; and subtraction circuitry for subtracting the estimated components from the delayed digitized baseband composite signal to create a corrected digitized baseband composite signal.

According to a third broad aspect, the invention provides a CDMA receiver comprising: an antenna for receiving an RF composite spread spectrum signal over an air interface; RF down conversion and A/D conversion circuitry for converting the composite spread spectrum signal into a digitized composite baseband signal; an interference cancellation circuit for cancelling interference due to pilot channel components of the baseband digitized composite signal which contain both known pilot bits and unknown power control bits, the interference cancellation circuit comprising: a) pilot channel detection and air interface and characterization circuitry for detecting the pilot channel components present in the composite baseband digitized signal and making a respective channel estimate of an air interface over which each said pilot channel component was received; b) power control bit detection circuitry for estimating the power control bits in said pilot channel components; c) combining circuitry for combining for each pilot channel component in a respective combined information the pilot bits with the associated estimated power control bits; d) pilot channel reconstruction circuitry for creating a regenerated baseband digitized pilot channel component for each said combined information which is an estimate of the pilot channel component as it would have been received taking into account the respective channel estimate; e) delay circuitry for delaying the digitized baseband composite signal an amount substantially equal to the time it takes to make the estimates of the pilot channel components; and f) subtraction circuitry for subtracting the estimates of the pilot channel components from the delayed digitized baseband composite signal to produce a corrected composite digitized baseband signal; a baseband detection unit for each user connected to receive the corrected composite digitized baseband signal and the channel characterization information for that user, for producing one or more received data streams for that user.

According to a fifth broad aspect, the invention provides a method of reducing interference due to particular components of a composite digitized baseband signal, each particular containing a respective known information and a respective unknown information, the method comprising the steps of: detecting the known information for each particular component and producing a respective estimate of an air interface over which each particular component was received; making an estimate of each unknown information; combining the estimate of the unknown information with the respective known information to create a combined information for each said particular component; passing each combined information through a model of the respective air interface which is based upon the respective estimate of the air interface to produce a respective estimated component; delaying the composite digitized baseband signal to produce a delayed composite digitized baseband signal an amount of time equal to how long it takes for the steps of detecting, making an estimate, combining and passing; and subtracting the estimated components from the delayed composite digitized baseband signal to produce a corrected composite digitized baseband signal.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In order to understand the invention it is important to have an appreciation of CDMA cellular systems. A brief overview of a CDMA cellular system will be given with reference to FIG. 1.

CDMA Cellular System Overview

Figure 1:
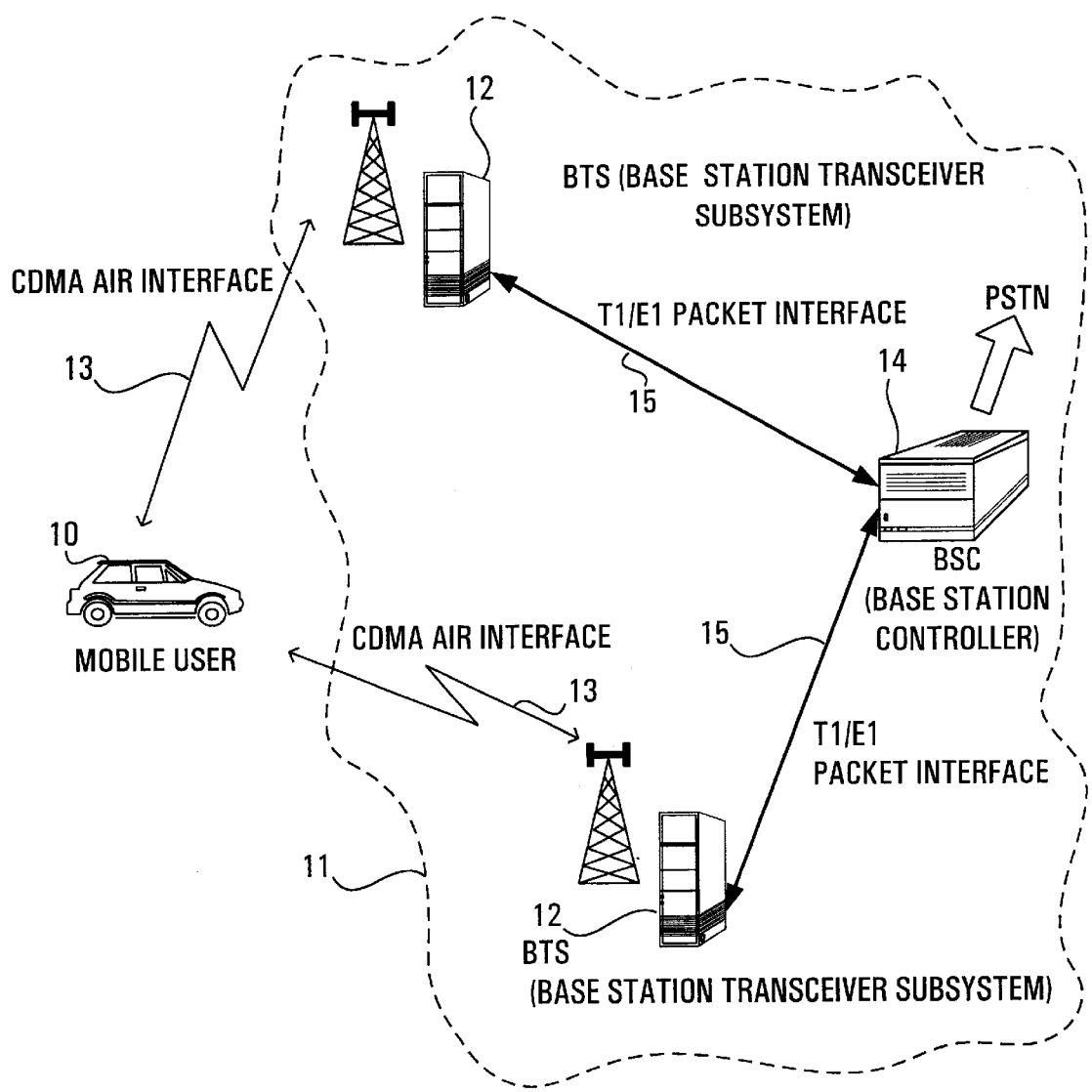
FIG. 1 is an overview of a conventional CDMA cellular system.

Referring firstly to FIG. 1, a generic CDMA cellular system comprises a plurality of terminals 10 (only one shown, shown inside a car), connectable through a CDMA air interface 13 to a network 11 comprising a plurality of BTSs 12 (only two shown), a plurality of BSCs 14 (only one shown) each connected to one or more BTSs, with each BSC connected to a MSC (mobile switching centre, not shown) forming part of or connected to a PSTN (public switched telephone network, not shown).

The terminal 10 consists of equipment used by an end user to make access to the network 11. It may provide voice only, data only, simultaneous voice and data, and location services for many different environments including indoor, low mobility, full mobility and fixed wireless. Within these different applications the terminal 10 may be referred to as a mobile station (MS), handset or simply mobile.

The BTSs 12 convert the network baseband data to signals compatible with the CDMA air interface 13. The link between the terminal 10 and the BTS 12 is over the air on the desired frequency band (e.g., cellular, PCS). The links between the BTSs 12 and the rest of the network 11 (through the BSC 14) are T1/E1 packet interfaces 15 that are typically carried over wire lines. The BTS 12 performs basic functions such as baseband signal processing (modulation, demodulation, encoding, decoding), channelization, conversion to and from RF (radio frequency), signal power amplification and transmission over the air interface.

The BSC 14 performs two principle functions. Firstly it performs the signal processing functions not encompassed within the BTS such as vocoder and soft handoff signal combining. Secondly it acts as the controller for numerous BTSs 12. It performs such functions as call setup/tear down, BTS 12 static and dynamic configuration and operations, administration and maintenance.

The MSC provides an interface to the PSTN and, therefore, allows mobile users to make access to the wider telephone network.

The link from the MSC to the terminal 10 is the "forward link" and the link from the terminal 10 to the MSC is the "reverse link".

In the forward link direction, data packets are sent by the BSC 14 addressed to a particular BTS 12 (or BTSs for soft handoff). The BTS 12 converts the packets into a form that adheres to a particular CDMA air interface standard. The BTS 12 then transmits the data to the terminal 10 over the CDMA air interface 13. In addition to performing this signal processing and routing function, the BTS 12 efficiently manages its resources and monitors performance. It also performs many of the management and control functions required to support the CDMA air interface standard. For example, it creates pilot, sync, and overhead channels.

In the reverse link direction the terminal 10 transmits its data to the BTS 12 over the CDMA air interface 13. The ETS 12 receives this data and converts it to a packet format that can be sent to the BSC 14 over the T1/E1 packet interface 15.

Figure 2:
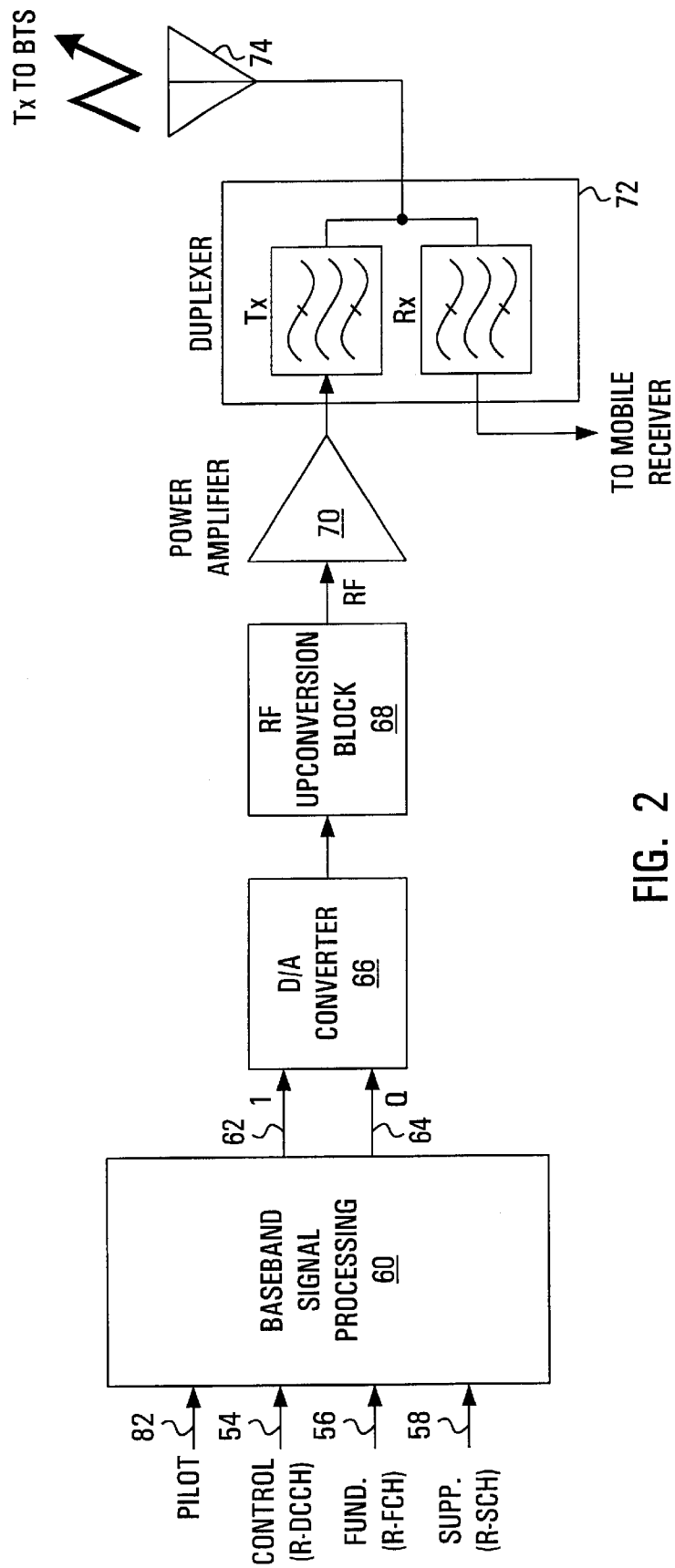
FIG. 2 is a block diagram of a conventional mobile station transmitter.

A conventional CDMA 3G mobile transmitter will now be described with reference to FIG. 2. To support various end user services, the mobile transmitter divides its transmitted data content into four channels. One of these channels is used to manage the air interface resource and aid in signal detection, namely the pilot channel 82. The pilot channel consists of pilot bits and PC bits multiplexed together in a 3 to 1 ratio. In each 1.25 ms time interval of pilot channel, the first three quarters of the time interval contains three known pilot bits while the fourth quarter of the time interval contains a single unknown PC bit. The PC bits are used to instruct the basestation to either increase or decrease the forward link power.

The three remaining channels consist of the control channel (R-DCCH) 54, the fundamental channel (R-FCH) 56, and the supplemental channel (R-SCH) 58, all of which are used to convey information. All of these channels are combined and processed at baseband in a baseband signal processing block 60 which functions as described in further detail below with reference to FIG. 3. The baseband signal processing block 60 produces in-phase (I) and quadrature (Q) digital baseband signals 62,64 which are converted to analog form by a digital-to-analog converter 66 and upconverted to the desired frequency band (PCS or Cellular for example) in a radio frequency upconversion block 68. Block 68 has an RF output which is fed through a power amplifier 70 to a duplexer filter 72 and on to the antenna 74 which transmits signals over the air interface for reception by a basestation. The duplexer filter 72 separates the mobile's transmit and receive bands. While a single physical RF spread spectrum signal is transmitted for each user, the RF spread spectrum signal may be considered as containing four components, one for each channel. At the receiver, the channels for three of these components will be completely unknown, while the channel for the fourth component will contain known data (the pilot bits) and unknown data (the PC bits).

Figure 3:
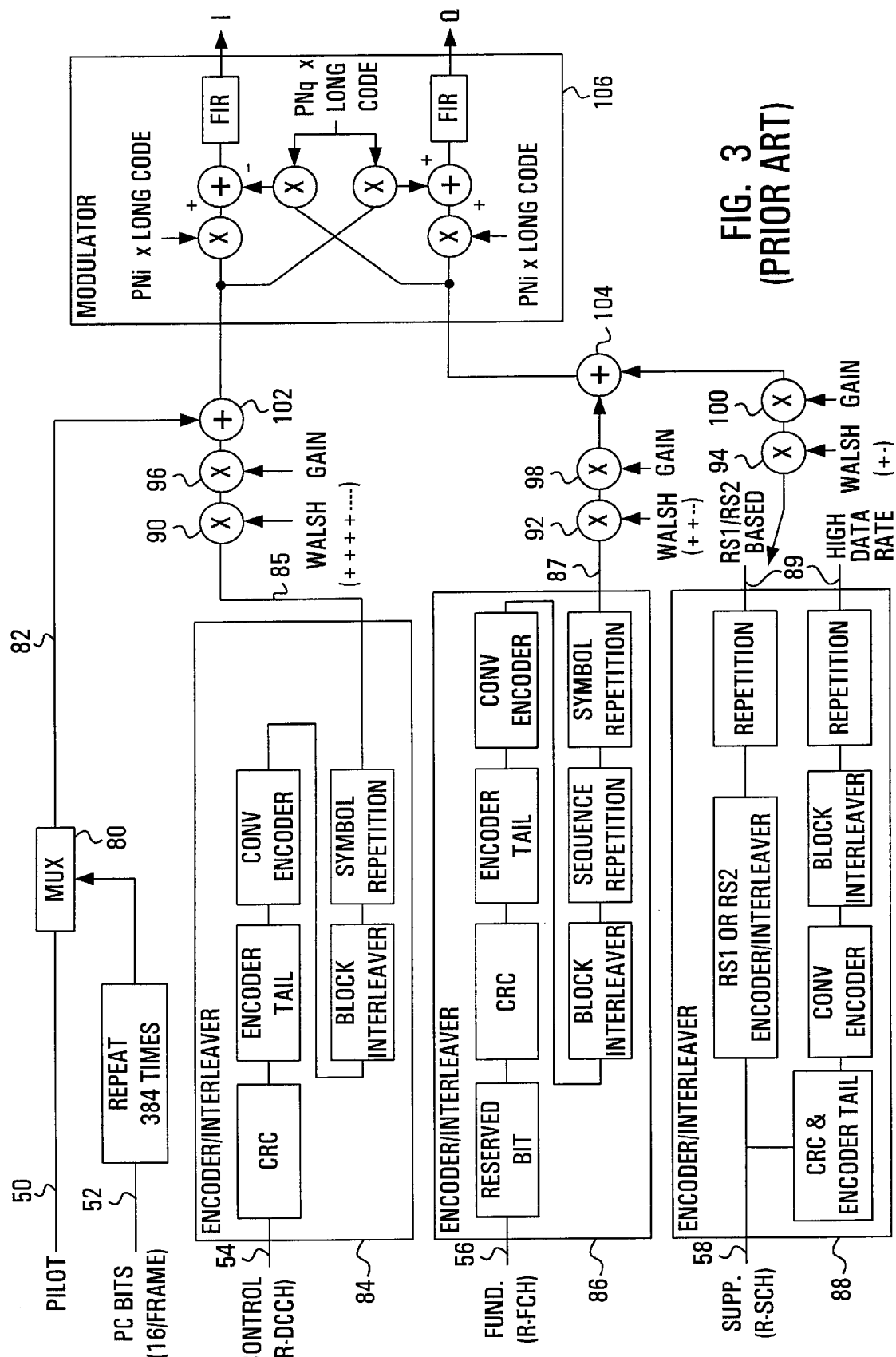
FIG. 3 is a detailed block diagram of the baseband signal processing block of FIG. 2.

The details of the baseband signal processing block 60 are illustrated in FIG. 3. A multiplexer 80 multiplexes the pilot and power control bits 50,52 together to form a single channel 82 as described previously. The remaining three channels 54,56,58 are encoded and interleaved by respective encoder/interleaver blocks 84,86,88 each containing encoding and interleaving functionality particular to the channel type. Each of the encoder/interleaver blocks 84,86,88 have outputs 85,87,89 connected to respective Walsh code modulators 90,92,94 and subsequently to gain blocks 96,98,100. The Walsh code modulators modulate the outputs 85,87,89 by respective short Walsh codes which uniquely identify each of the various channels. For CDMA 3G, the Walsh code (++++----) is used for the control channel output 85, the Walsh code (++--) is used for the fundamental channel output 87, and the Walsh code (+-) is used for the supplemental channel output 89. The combined pilot/PC channel is uniquely identified by the all ones short Walsh code which has been left off the figure since it has no effect upon the signal. The unique short Walsh codes enables the basestation receiver to separate the channels.

The Walsh modulated channels are then combined with adders 102,104 and processed by a short and long code modulator 106. This modulator 106 further modulates the combined channels by the user's unique long code and the particular cell's short code (PNi, PNq). This modulation enables the separation of the various users at the basestation receiver.

All of the user's transmitters are constructed in this manner. Multiple users in one cell are uniquely identified by their different long codes. The basestation receiver uses these different long codes to individually detect the ensemble of users received at the basestation.

Figure 4:
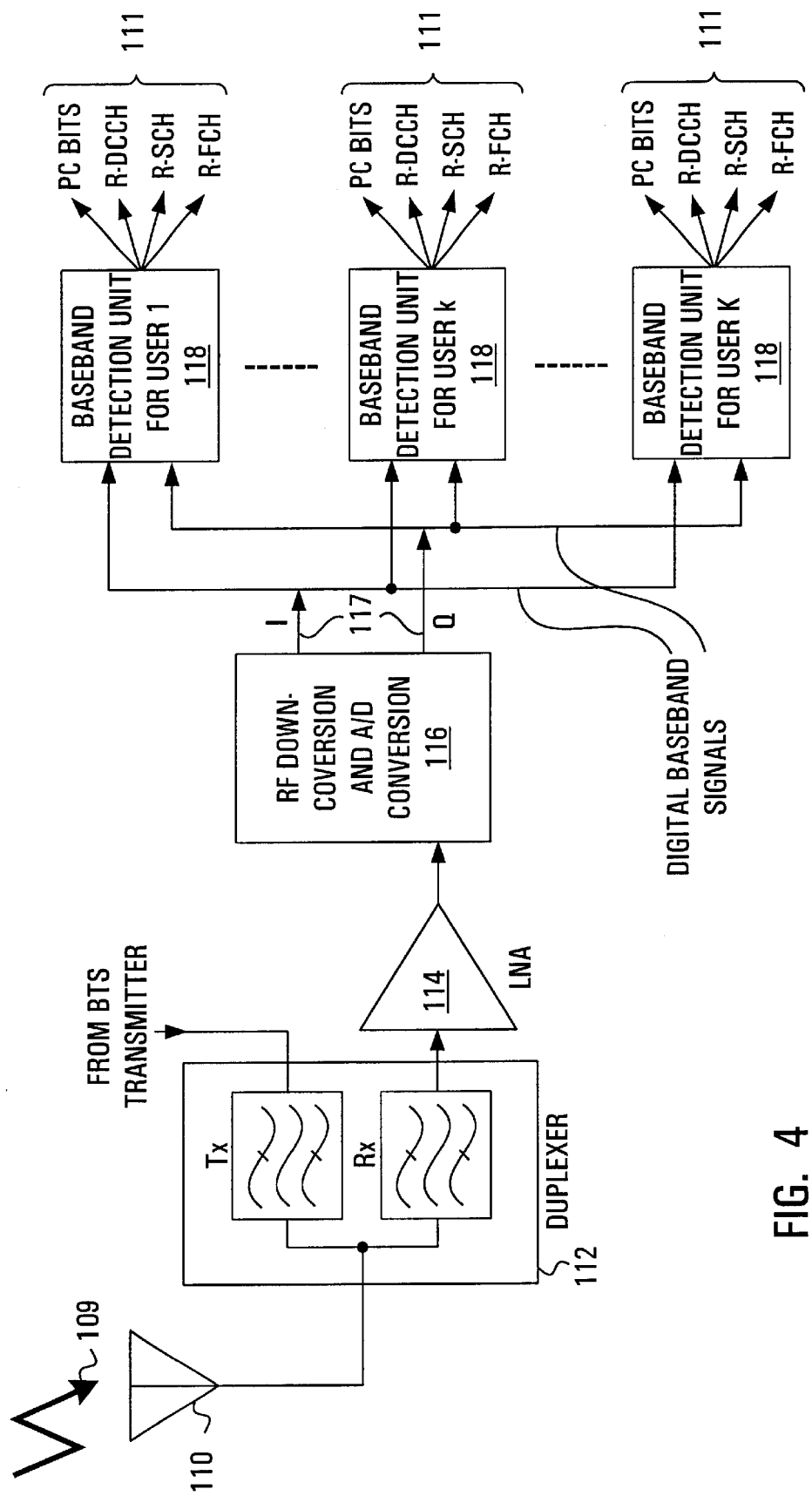
FIG. 4 is a block diagram of a conventional basestation receiver.

Referring now to FIG. 4, a conventional basestation receiver has the task of demodulating and decoding the signals from an ensemble of users. Its input 109 is the sum of all of the mobile's RF spread spectrum signals transmitted over the air. Its outputs are the individual user channel data streams 111 as sent by the mobiles.

There are five major parts to the basestation receiver as illustrated in FIG. 4. The antenna 110 receives the mobile's RF spread spectrum signals 109 from the air. The duplexer 112 separates the basestation receive signals from the basestation transmit signals that are delivered to the antenna 110. The low noise amplifier (LNA) 114 provides an initial low noise amplification of the received signals. The RF downconverter and A/D block 116 converts the air interface frequency band to a digitized base band composite signal 117 having I and Q components. At this point all the mobile user signals are present in the composite signal 117 and more particularly, the composite signal 117 will include a signal for each user, and each user signal will contain four digitized baseband components for the user, one for each channel. Each user signal contained in the composite signal 117 is in made up of one or more multipath signals, depending upon the air interface channel for the particular user. Finally several baseband detection units 118, one for each active user, separate the individual user's signal from the digitized baseband composite signal 117 and produces the individual user's channel data streams 111.

Figure 5:
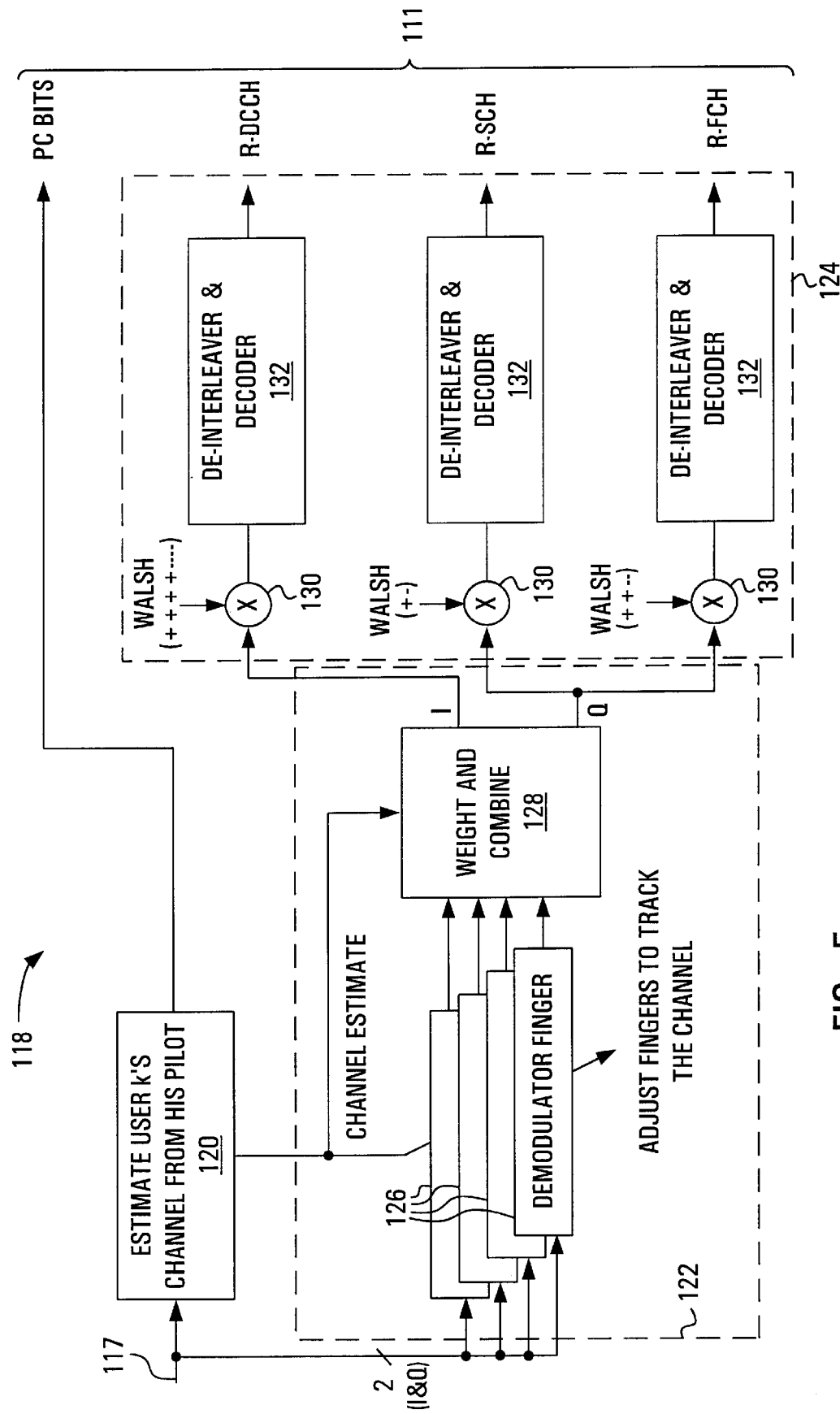
FIG. 5 is a detailed block diagram of a single baseband detection unit of FIG. 4.

The conventional baseband detection unit 118 is illustrated in detail in FIG. 5. There are three major functions performed within the baseband detection unit 118. It estimates the air interface channel (block 120); it detects and combines the multipath signals (block 122); and it separates and decodes the user's channel data streams (block 124).

The estimates of the user's air interface channel determine the number and strength of the multipath signals. The a priori known pilot channel is used to facilitate this process. The air interface channel estimate is used to adjust a plurality of fingers 126 which detect the user signal on each of the multipaths. In the illustrated example, there are four fingers 126 which can track up to four multipaths. An implementation may use more or fewer fingers depending upon the performance requirements. The fingers 126 have outputs which are combined in a weight and combine block 128 to produce a single combined signal which is stronger than any of the individual multipath components. The combined signal is then separated into the user channels by multiplying by the channel short Walsh codes 130. The final step is to de-interleave and decode 132 the individual sub-channels to yield the transmitted channel data streams 111.

The baseband detection unit 118 in the conventional basestation receiver only looks at a single user and considers all other users in the digitized baseband composite signal 117 to be noise. This receiver architecture ignores the inherent structure of the user's transmitted signals. Each pilot channel has a simple structure and the pilot channel component (the component of the spread spectrum signal due to the pilot channel) can represent up to 30% of the power transmitted by the mobile. In a large ensemble of users, the total pilot power of all of the users can be up to 30% of all the interference received at the basestation. This invention provides a system and method for the removal of the pilot channel component before detecting the individual user information channels thus reducing the interference level by as much as 30%.

The invention provides for the removal of the interfering pilot channel component from the desired information channel components according to a multiple step process. By way of overview, first, the pilots from all of the received users are simultaneously detected. This is a simple process since the pilot data stream is known a priori. In detecting the pilot, an estimate of the air interface channel characteristics is made to determine the strength, number and position of the multipaths of each user's signal. The channel information along with the pilot timing is used to reconstruct the received digitized baseband pilot channel component for each user. Then, the reconstructed digitized baseband pilot channel components from all of the interfering users are combined and subtracted from the digitized baseband composite received signal. This removes the interfering digitized baseband pilot channel components from the digitized baseband composite received signal thus improving the signal-to-noise ratio of the users' information bearing channels.

Figure 6:
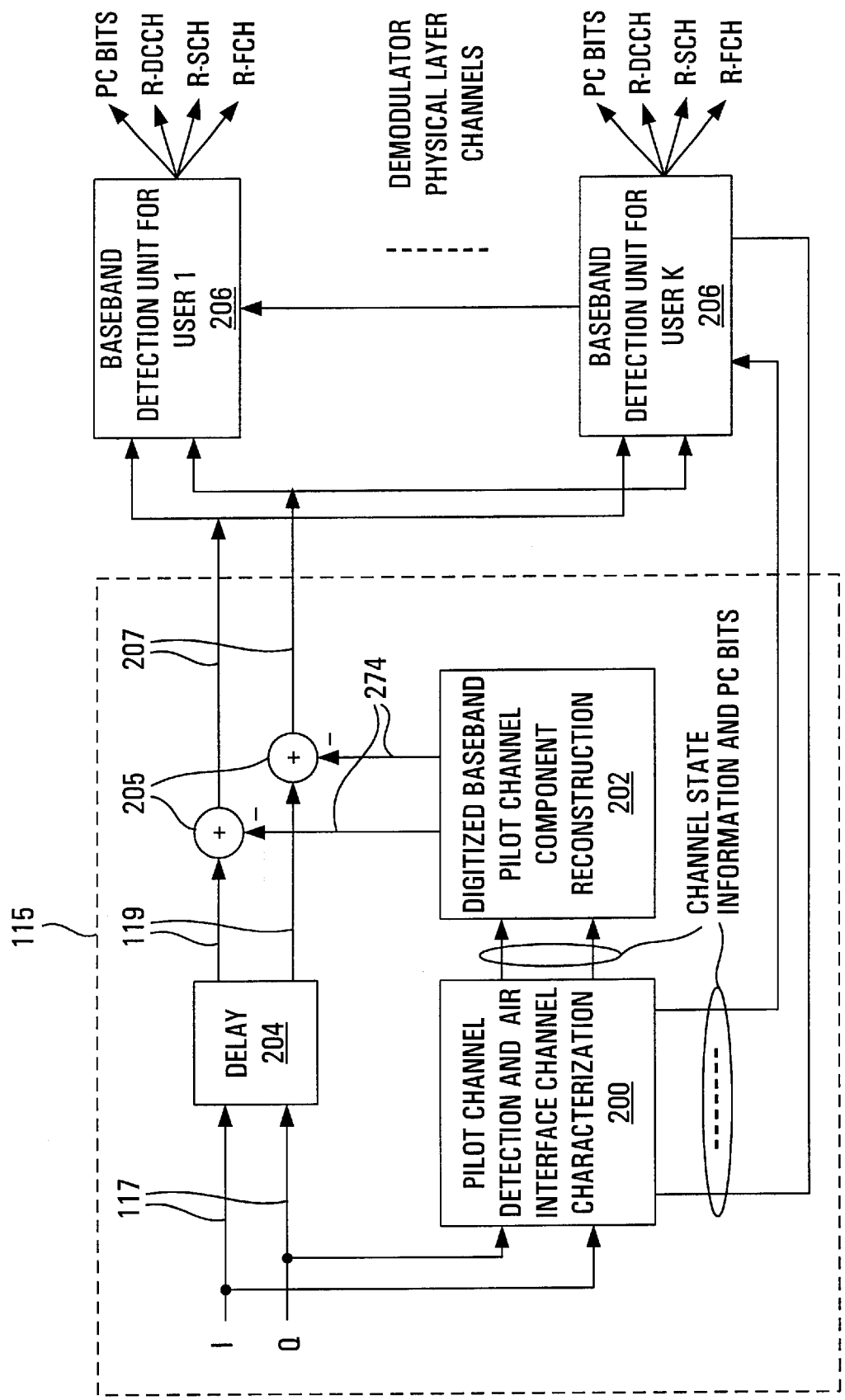
FIG. 6 is a block diagram of a basestation receiver architecture according to an embodiment of the invention.

Referring now to FIG. 6, an interference cancellation circuit provided by an embodiment of the invention is generally indicated by 115 and comprises a known information detection and air interface characterization circuitry which for a CDMA 3G embodiment is a pilot channel detection and air interface channel characterization block 200 which receives as its input the digitized baseband composite signal 117, a digitized baseband component regeneration circuitry which for CDMA 3G is a digitized baseband pilot channel component reconstruction block 202 which outputs a composite digitized baseband pilot channel component reconstruction 274, delay circuitry 204 which produces a delayed digitized baseband composite signal 119, subtraction circuitry which in the illustrated embodiment consists of two subtracters 205 which subtract the composite digitized baseband pilot channel component reconstruction 274 from the delayed digitized baseband composite signal 119 to produce a corrected baseband composite signal 207 which has reduced interference. The output of the interference cancellation is fed to a plurality of baseband detection units 206, one for each user.

Figure 8:
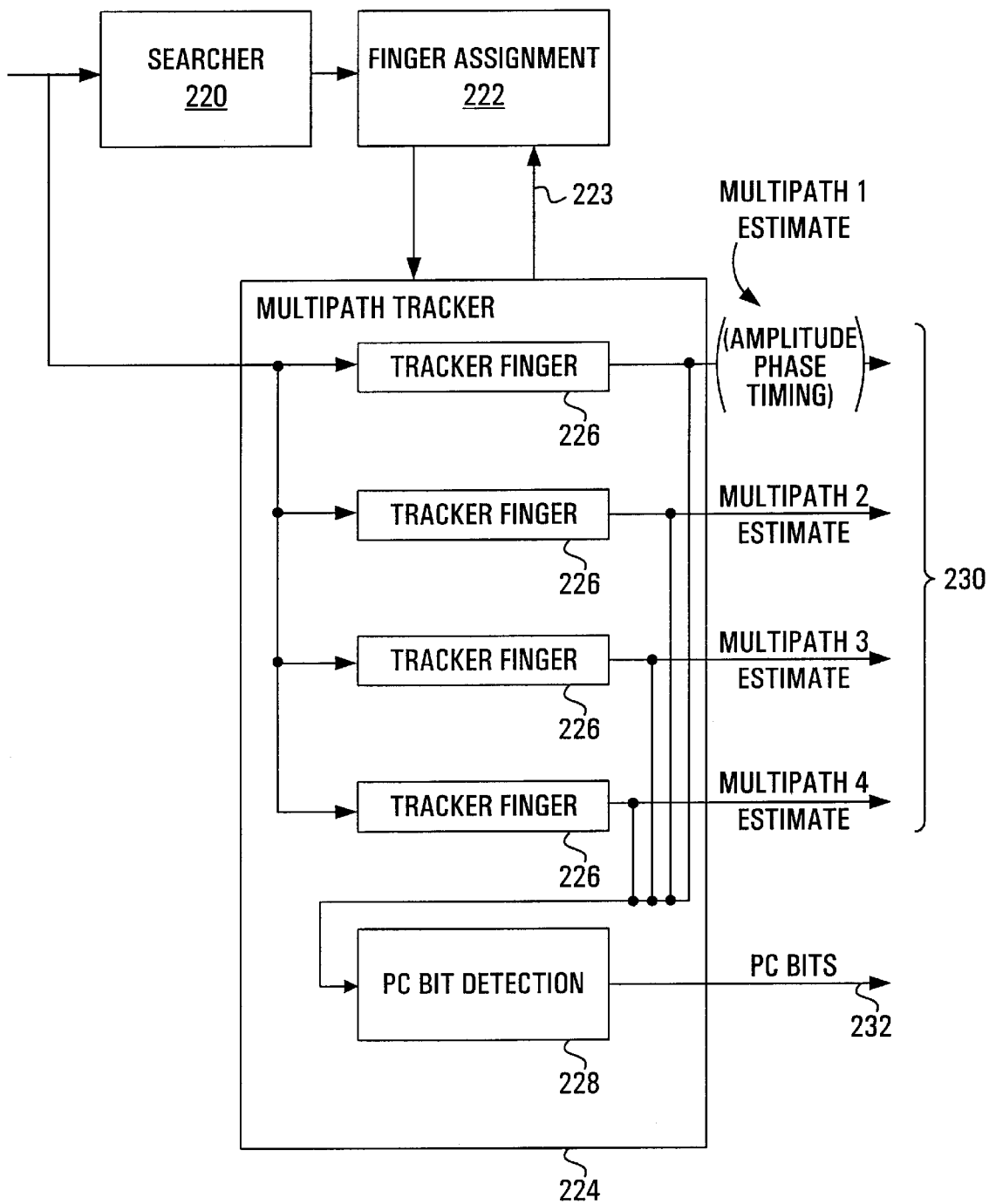
FIG. 8 is a block diagram of the pilot channel detection and channel characterization block of FIG. 6.
Figure 9:
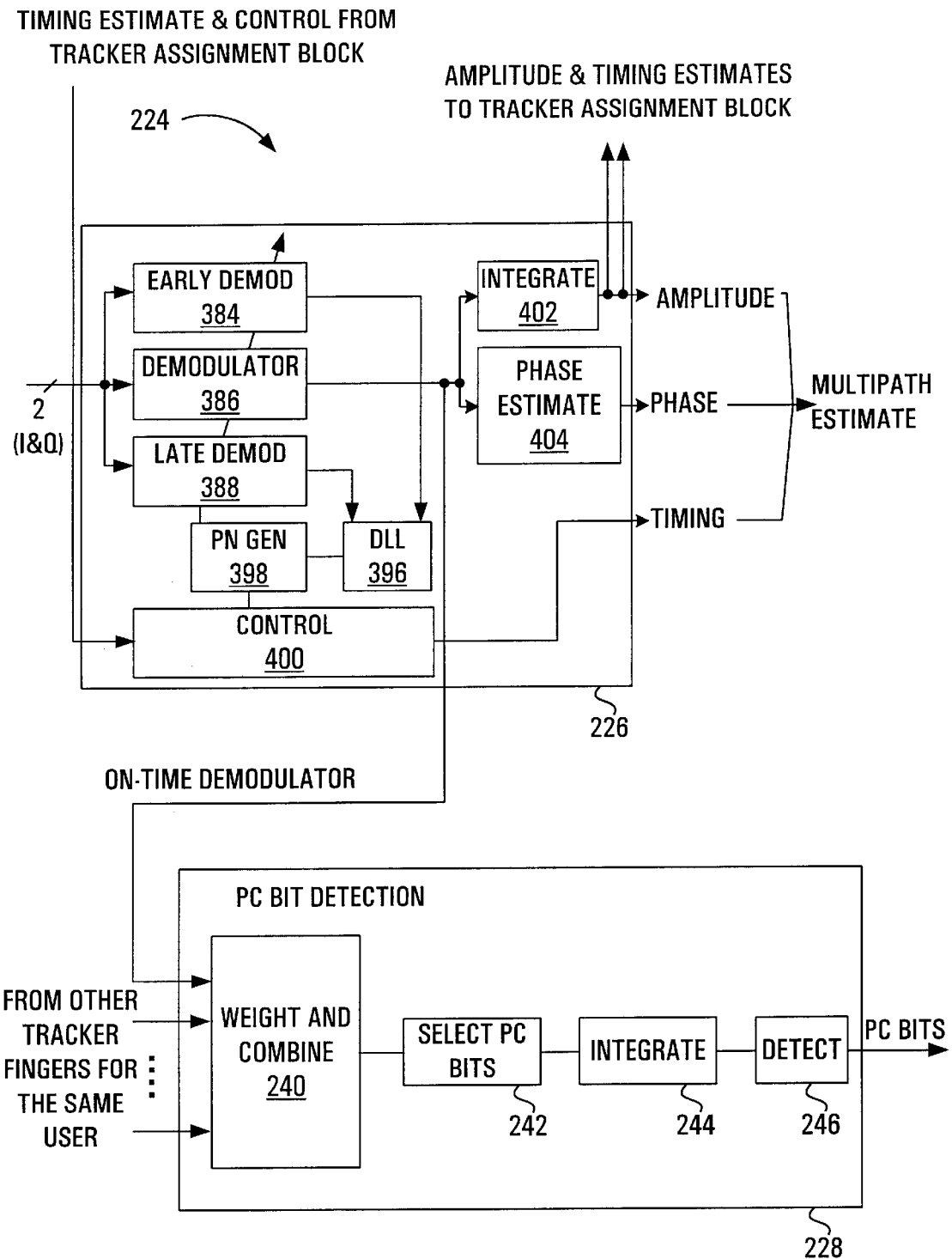
FIG. 9 is a block diagram of a single multipath tracker of FIG. 8.

The functionality of the pilot channel detection and air interface channel characterization block 200 will be described with reference to FIG. 8. The functionality of FIG. 8 is duplicated for each user. Alternatively, resources may be shared across users, for example as disclosed in applicant's copending U.S. application Ser. No. 09/132,466 filed Aug. 11, 1998 which is hereby incorporated by reference. The pilot channel detection and air interface channel characterization block 200 includes a searcher block 220, a finger assignment block 222 and a multipath tracker block 224. The searcher block 220 identifies multipaths of the user's signal in a conventional manner. The multipath tracker block 224 produces detailed multipath estimates and performs PC bit detection. The multipath tracker block 224 contains a number of tracker fingers 226, each tracker finger enabling the tracking of a single multipath of the particular user's signal. The singer assignment block 222 decides which multipaths to track, and assigns tracker fingers 226 to these multipaths. This is done in conjunction with amplitude and timing information 223 fed back from the tracker fingers 226. The multipath tracker 224 can track a number of multipaths equal to the number of tracker fingers 226 it contains. Typically four fingers are used, but more or less may be used depending upon the performance requirements. Each tracker finger 226 characterizes a multipath according to three quantities, namely its amplitude, phase, and timing. These three quantities along with the power control bits provide sufficient information to re-construct the digitized baseband pilot channel component for that particular user. The searcher 220 and tracker finger 226 construction may have the same design as searchers and trackers used in detecting pilot signals and determining multipaths for use in conventional receivers. By way of example, a multipath tracker 224 is shown in FIG. 9 where only a single tracker finger 226 is shown.

Each tracker finger 226 comprises three demodulators 384,386,388, a delay locked loop algorithm (DLL) 396 and a delay locked loop control block 400. The three demodulators 384,386,388 are configured to process delayed versions of the same input signal (the demodulators are referred to as early, on-time and late). Typically a delay of ½ a chip between demodulators 384,386,388 is used. At the input to each demodulator the signals are interpolated to 8 fc and delayed by an amount appropriate to that demodulator. The early and late demodulator outputs are then processed within the delay locked loop algorithm 396. A delay locked loop output is used by the control block 400 and a PN generation block 398 for delay adjustment of the demodulators and to perform arrival tracking of the multi-path so as to generate a timing estimate. The timing estimate determines where the start of a frame is with respect to a system clock, for example.

The on-time demodulator 386 has an output which is fed to an integrate function 402 which produces an estimate of the amplitude (or attenuation) of the particular multipath. The same output is fed to a phase estimate function 404 which produces an estimate of the phase of the particular multipath. The phase estimate is an estimate of the chip phase with respect to a system clock for example.

The searcher 220 tells the tracker fingers 226 which multipaths to lock onto and follow. The on-time demodulator output of each tracker finger 220 is fed to a weight and combine block 240 forming part of the PC bit detection block 228. The weight and combine block 240 has circuitry for selecting the PC bits 242, integrating them 244, and detecting the PC bits 246. The PC bit detection block 228 is conventional except that it is located prior to and separate from the baseband detection units 206.

Figure 10:
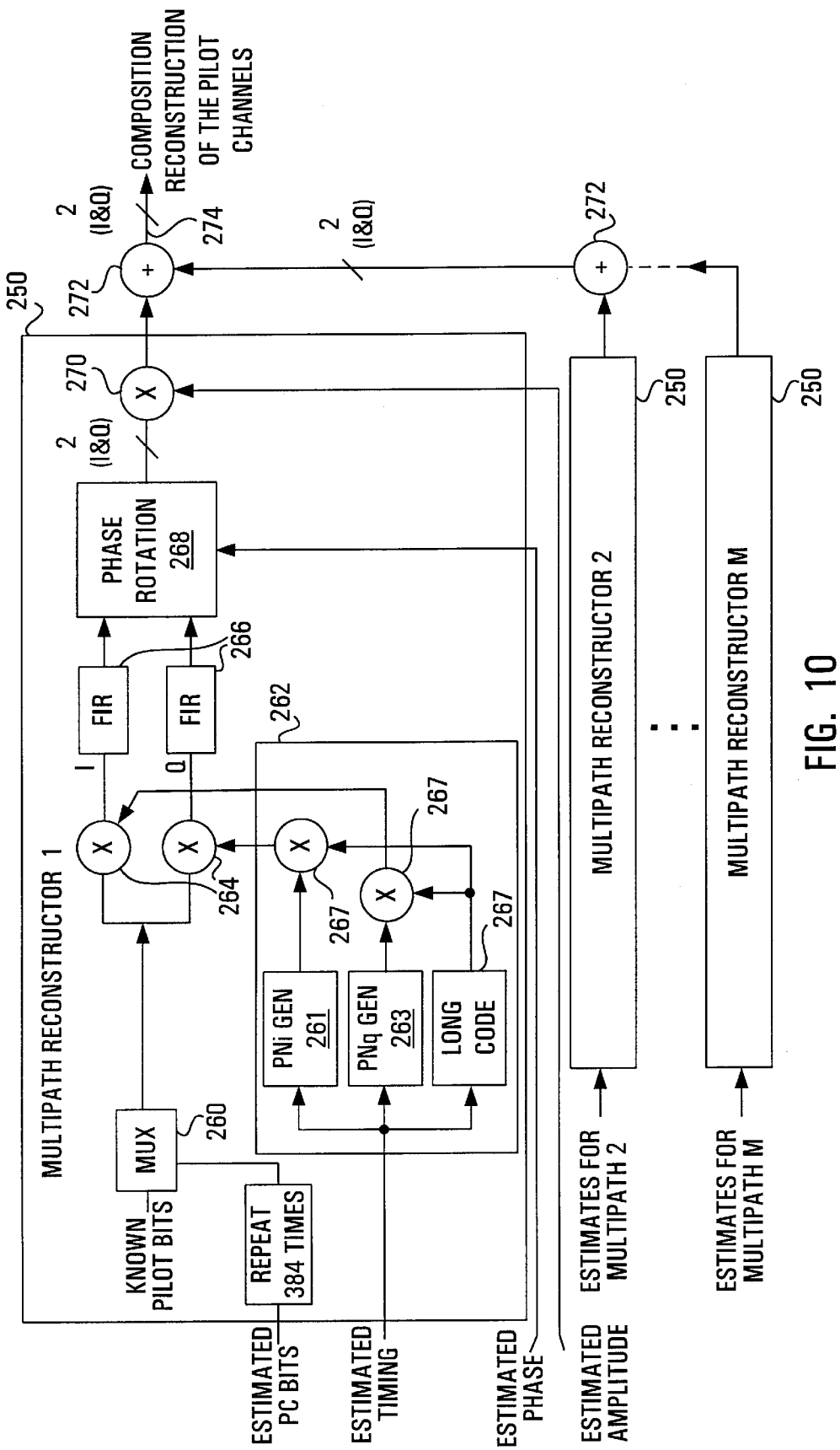
FIG. 10 is a block diagram of the pilot channel component reconstruction block of FIG. 6.

The details of the digitized baseband pilot channel component reconstruction block 202 will be described with reference to FIG. 10. There is a separate multipath reconstructor 250 for each tracker finger 226 for any user. For example if there are eight users and four tracker fingers per user, then the digitized baseband pilot channel component reconstruction block 202 requires 8×4=24 multipath reconstructors 250. The input to each multipath reconstructor is the channel estimate (timing, phase, amplitude) for that particular multipath and the PC bits. Each multipath reconstructor 252 contains a stripped down version of a mobile transmitter, containing only the pilot channel portion. This consists of a multiplexer 260 for multiplexing the estimated PC bits with a known pilot signal, and a PN code generator 262, which has a PNi sequence generator 261, a PNq sequence generator 263 and a long code sequence generator 265 which are combined in multipliers 267 and then multiplied by the multiplexed signal with multipliers 264. The timing estimate is used to identify starting state for the PNi, PNq, and long code generators 261,263,265. Each of the PNi, PNq and long code sequences are generated by binary shift registers which have predetermined contents for each instant in time with respect to the start of a Frame. The timing estimate is used to identify this starting state information. There are known method for identifying PN states from timing offsets which may be used here. FIR (finite impulse response) filters 266 generate the actual pulse shapes for the pilot signal. A phase rotation block 268 is used to add in the estimated phase of the particular multipath. This is achieved by multiplying the FIR filter I and Q outputs by $e^{j\phi}$, where $\phi$ is the phase estimate produced by the phase estimation function 404 (See FIG. 9). An amplitude weighting function (or attenuator) 270 is used to effect the estimated amplitude for the particular multipath. This is achieved by multiplying both I and Q outputs by the amplitude estimated by the integrate block 402 (see FIG. 9). The output of the amplitude weighting function 270 is an estimate of the particular digitized baseband pilot channel component as it would have been received.

Each multipath reconstructor 250 may be considered a model of the respective air interface, and generates such a multipath estimate, and these are added together with one or more adders 272 to generate a composite digitized baseband pilot channel component reconstruction 274. This composite digitized baseband pilot channel component reconstruction 274 is subtracted from the delayed digitized baseband composite signal 119 (see FIG. 6) to create a corrected digitized baseband composite signal 207 substantially devoid of digitized baseband pilot channel component contents.

To compensate for the delay introduced in blocks 200, 202, the delay block 204 introduces a comparable delay into the digitized baseband composite signal 117 to synchronize the signal path pilot signals with the composite digitized baseband pilot channel reconstruction 274 before subtraction. The corrected digitized baseband composite signal 207 is passed to the new baseband detection units 206.

Figure 7:
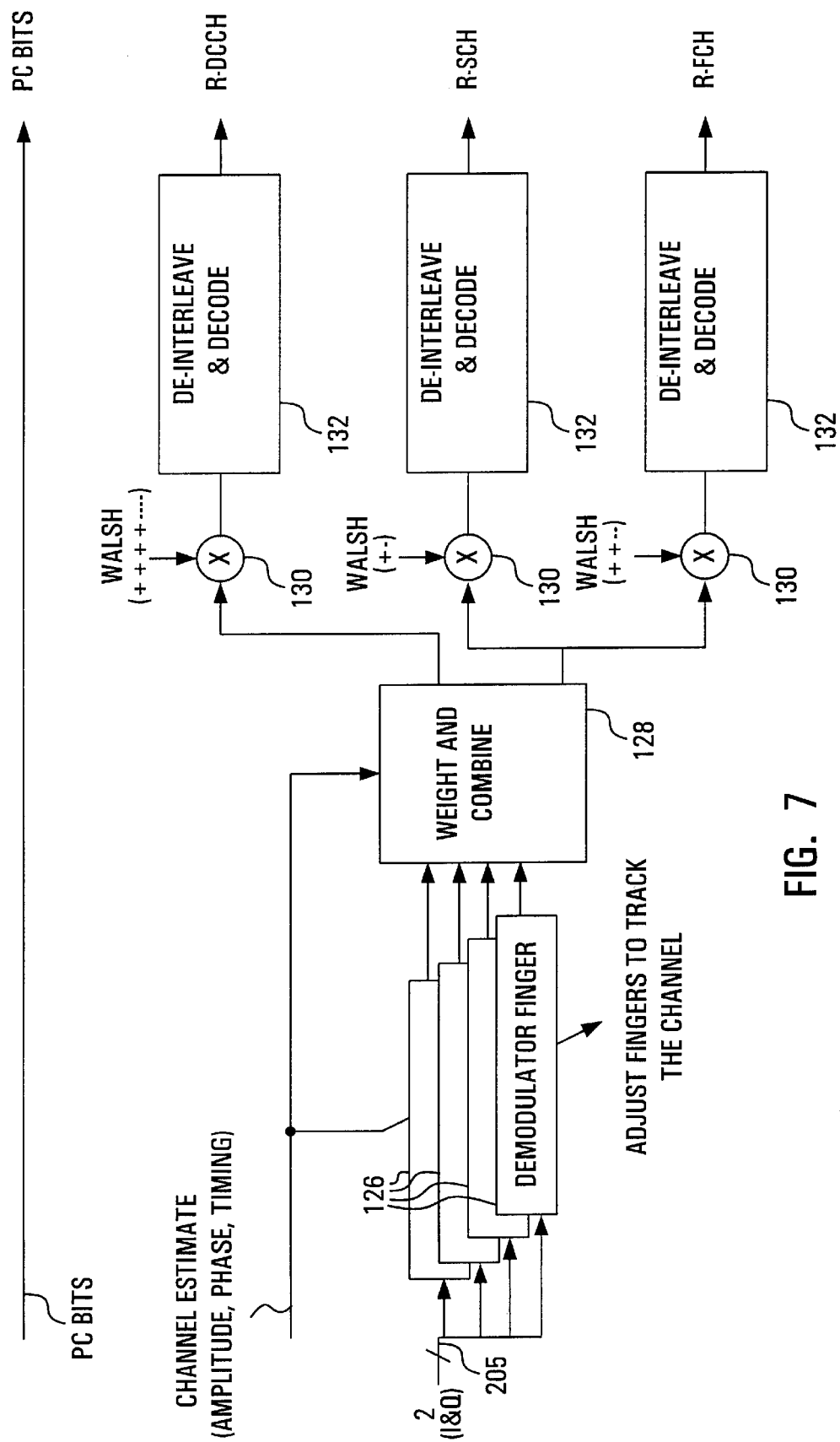
FIG. 7 is a block diagram of a single baseband detection unit of FIG. 6.

A block diagram of one such new base band detection unit 206 is shown in FIG. 7. This structure is used in place of the conventional structure for the baseband detection units 118 shown in FIG. 5. The baseband detection units use the corrected digitized baseband composite signal 207 to detect the users individual channels. The base band detection unit 206 is the same as the baseband detection unit 108 used for conventional basestations except that detection of the pilot channel, channel characterization, and PC bit detection functionality is not included since these tasks have been completed by another block, namely the above described pilot channel cancellation circuit. The channel information gained by detecting the pilot signals is also passed on to the baseband detection units to steer the demodulation process in a conventional manner.

It is noted that in the above embodiment some of the circuitry in the cancellation circuit has been simply moved from its normal position within the baseband detection units to its new position in the interference cancellation circuit, this circuitry being the pilot channel detection and air interface characterization. Thus, only the delay circuitry and the digitized baseband pilot channel component reconstruction circuitry contribute to an increase in the complexity of the overall receiver.

A preferred embodiment of the invention has been provided which comprises the above described pilot channel cancellation circuit and variants thereof. More generally, a preferred embodiment of the invention comprises an interference cancellation circuit for cancelling interference due to a known information channel contained in a component of a composite digitized baseband signal, the circuit comprising known information detection and air interface characterization circuitry, component regeneration circuitry, delay circuitry subtraction circuitry.

Numerous modifications and variations of the present invention are possible in light of the above teachings. It is therefore to be understood that within the scope of the appended claims, the invention may be practised otherwise than as specifically described herein.

The invention has been described with reference to a system employing CDMA 3G. In this case each transmitter transmits an RF spread spectrum signal containing four components, and one of the components, namely the pilot channel component, contains both known and unknown data. The invention may be employed in CDMA 3G and other systems containing such known and unknown contents so as to remove the interference due to the component containing known and unknown data. In such a system, an estimate of the unknown data must be made, for example as described above for the PC bits in the CDMA 3G embodiment. Alternatively, in a system which includes a component which only contains known data, the invention may be also practised and applied without the need to estimate the unknown component.

We claim:

1. An interference cancellation circuit for cancelling interference due to known information contained in a component of a digitized baseband composite signal, the circuit comprising:

known information detection and air interface characterization circuitry for detecting said known information stream, demodulating said component and making an air interface characterization which is an estimate of an air interface channel over which the component was transmitted;

digitized baseband component regeneration circuitry for generating an estimated component which is an estimate of said component of the digitized baseband composite signal by modulating said known information stream taking into account said air interface channel characterization;

delay circuitry for delaying the digitized baseband composite signal an amount substantially equal to the time it takes the known information detection and air interface characterization circuitry and component regeneration circuitry to create the estimated component; and subtraction circuitry for subtracting the estimated component from the delayed digitized baseband composite signal to create a corrected digitized baseband composite signal.

2. A circuit according to claim 1 wherein said air interface characterization comprises an estimated phase shift, an estimated attenuation and an estimated timing for each of several multipaths of said component.

3. The circuit of claim 1 wherein:

said digitized baseband composite signal contains a plurality of mobile station components; and each said mobile station component includes a respective first component carrying known information and one or more second components carrying unknown information.

4. The circuit of claim 3 wherein for each mobile station component, the respective first component is a pilot channel component.

5. The circuit of claim 1 wherein said known information detection and air interface characterization circuitry comprises:

a searcher for identifying multipaths forming said component containing known information; and a plurality of tracker fingers each for tracking a respective multipath identified by the searcher and producing a respective multipath estimate consisting of an amplitude, phase and timing of the multipath.

6. The circuit of claim 5 wherein said component regeneration circuitry comprises for each multipath:

a modulator including code spreading and FIR filtering for multiplying the known data by I and Q spreading signals in accordance with said timing estimate;

a phase rotation function for applying a phase shift equal to said estimated phase;

an attenuation function for applying an attenuation equal to said amplitude;

summing circuitry for adding together the output of each multipath reconstructor.

7. An interference cancellation circuit for cancelling interference due to particular components of a composite baseband digitized signal which contains both known and unknown information, the circuit comprising:

known information detection and air interface characterization circuitry for detecting said known information, demodulating each said particular component and making an air interface characterization which is an estimate of an air interface channel over which the particular component was transmitted;

estimation circuitry for making an estimate of the unknown information in each said particular component containing known information;

combining circuitry for combining for each said particular component the known information with the estimated unknown information to make a respective combined information;

digitized baseband component regeneration circuitry for generating an estimated component for each said combined information which is an estimate of the respective particular component of the digitized baseband composite signal by modulating said combined information taking into account said air interface characterization;

delay circuitry for delaying the digitized baseband composite signal an amount substantially equal to the time it takes the known information detection and air interface characterization circuitry and component regeneration circuitry to create the estimated components; and subtraction circuitry for subtracting the estimated components from the delayed digitized baseband composite signal to create a corrected digitized baseband composite signal.

8. The circuit of claim 7 wherein the composite digitized baseband signal contains signals which are in accordance with the CDMA IS-95 3G standard, and the particular components comprise the pilot channel components of a plurality of users, each pilot channel component carrying known pilot bits and unknown power control bits.

9. The circuit of claim 7 wherein each particular component is a CDMA IS-95 3G pilot channel component, and the remaining components comprise fundamental, supplementary and control components.

10. The circuit of claim 8 wherein said estimation circuitry comprises power control bit detection circuitry for producing an estimate of the received power control bits.

11. The circuit of claim 10 wherein said air interface characterization comprises an estimated phase shift, an estimated attenuation and an estimated timing and wherein said component regeneration circuitry comprises for each multipath:

a multiplexer for combining the estimate of the power control bits with the known pilot channel bits to create the respective combined information;

a modulator including code spreading and FIR filtering for multiplying the combined information by I and Q spreading signals in accordance with said timing estimate;

a phase rotation function for applying a phase shift equal to said estimated phase;

an attenuation function for applying an attenuation equal to said amplitude;

summing circuitry for adding together the output of each multipath reconstructor.

12. A CDMA receiver comprising:

an antenna for receiving an RF composite spread spectrum signal over an air interface;

RF down conversion and A/D conversion circuitry for converting the composite spread spectrum signal into a digitized composite baseband signal;

an interference cancellation circuit for cancelling interference due to pilot channel components of the baseband digitized composite signal which contain both known pilot bits and unknown power control bits, the interference cancellation circuit comprising:

a) pilot channel detection and air interface and characterization circuitry for detecting the pilot channel components present in the composite baseband digitized signal and making a respective channel estimate of an air interface over which each said pilot channel component was received;

b) power control bit detection circuitry for estimating the power control bits in said pilot channel components;

c) combining circuitry for combining for each pilot channel component in a respective combined information the pilot bits with the associated estimated power control bits;

d) pilot channel reconstruction circuitry for creating a regenerated baseband digitized pilot channel component for each said combined information which is an estimate of the pilot channel component as it would have been received taking into account the respective channel estimate;

e) delay circuitry for delaying the digitized baseband composite signal an amount substantially equal to the time it takes to make the estimates of the pilot channel components; and f) subtraction circuitry for subtracting the estimates of the pilot channel components from the delayed digitized baseband composite signal to produce a corrected composite digitized baseband signal;

a baseband detection unit for each user connected to receive the corrected composite digitized baseband signal and the channel characterization information for that user, for producing one or more received data streams for that user.

13. A receiver according to claim 12 wherein the baseband detection units are also connected to receive the known pilot channel bits, and these are also output as a received data stream for that user.

14. A method of reducing interference due to components carrying known information in a composite digitized baseband signal comprising:

detecting the known information for each said component and producing a respective estimate of an air interface over which each said component was received;

passing the known information for each component through a model of the respective air interface which is based upon the respective estimate of the air interface to produce a respective estimated component;

delaying the composite digitized baseband signal to produce a delayed composite digitized baseband signal an amount of time equal to how long it takes for the steps of detecting and passing;

subtracting the estimated components from the delayed composite digitized baseband signal to produce a corrected composite digitized baseband signal.

15. A method of reducing interference due to particular components of a composite digitized baseband signal, each particular containing a respective known information and a respective unknown information, the method comprising the steps of:

detecting the known information for each particular component and producing a respective estimate of an air interface over which each particular component was received;

making an estimate of each unknown information;

combining the estimate of the unknown information with the respective known information to create a combined information for each said particular component;

passing each combined information through a model of the respective air interface which is based upon the respective estimate of the air interface to produce a respective estimated component;

delaying the composite digitized baseband signal to produce a delayed composite digitized baseband signal an amount of time equal to how long it takes for the steps of detecting, making an estimate, combining and passing; and subtracting the estimated components from the delayed composite digitized baseband signal to produce a corrected composite digitized baseband signal.

* * * * *